Aug. 2, 1960
J. V. BUSSONE
2,947,893
THRUST BEARING SUPPORT AND SPACER
ARRANGEMENT FOR ELECTRIC MOTORS
Filed Aug. 20, 1958
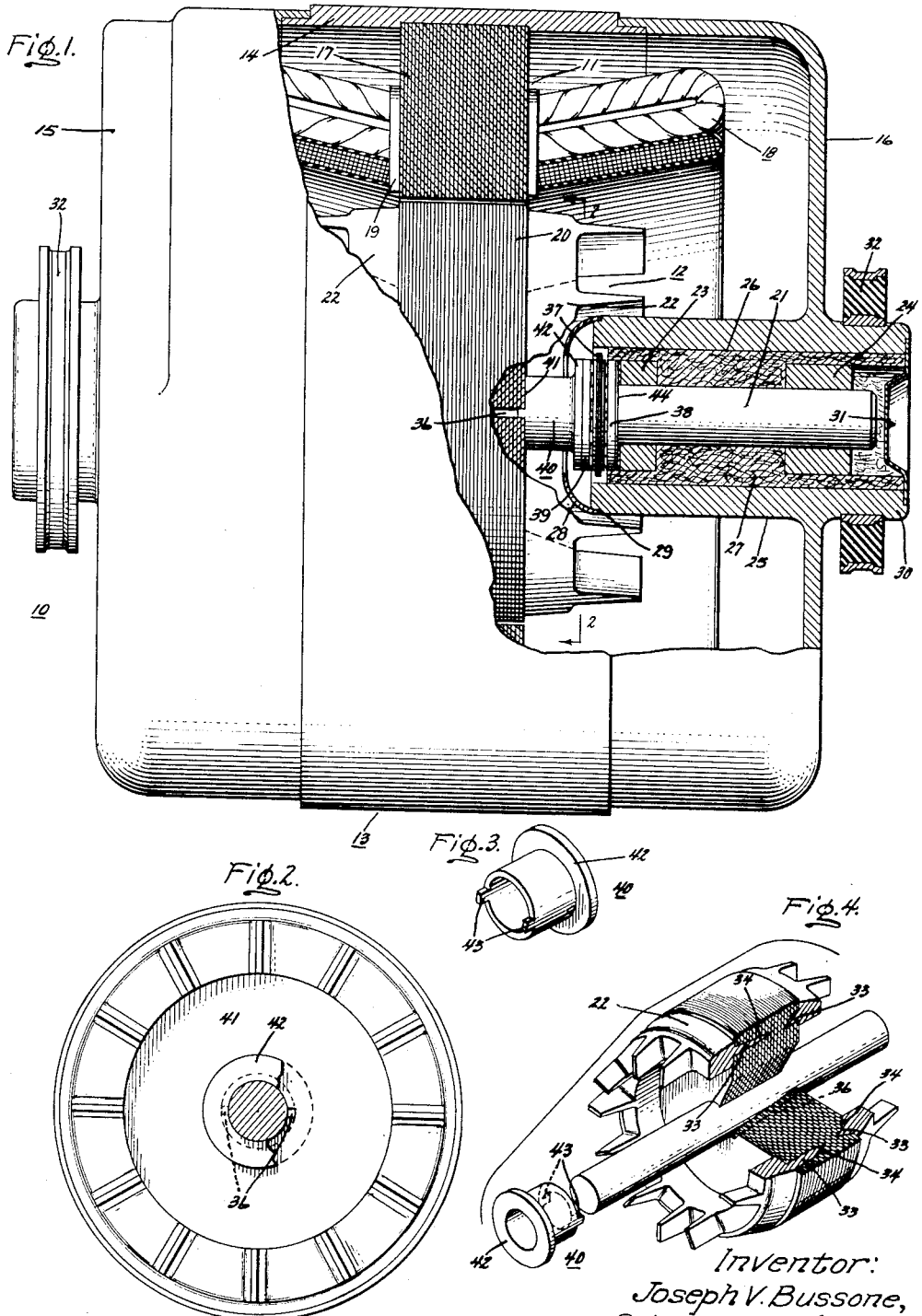
Inventor:
Joseph V. Bussone,
by H. F. Manbeck, Jr.
Attorney.

United States Patent Office 2,947,893
Patented Aug. 2, 1960

2,947,893

THRUST BEARING SUPPORT AND SPACER ARRANGEMENT FOR ELECTRIC MOTORS

Joseph V. Bussone, Sycamore, Ill., assignor to General Electric Company, a corporation of New York Filed Aug. 20, 1958, Ser. No. 756,237

4 Claims. (Cl. 310—90)

This invention relates to electric motors and other rotating machines, and more particularly to an improved thrust bearing support and spacer arrangement for the same.

One popular form of electric motor is of the induction type in which the rotor consists of a predetermined number of laminations permanently secured in juxtaposed relation. These laminations generally are provided with a plurality of slots normally parallel to the rotor shaft adapted to receive the rotor windings, either coils in the case of a wound rotor or solid cast conductors in the case of the squirrel cage type rotor. In certain induction motors of the squirrel cage type, instead of making the rotor slots parallel to the shaft, it has been found desirable to skew the slots at an angle with respect to the parallel position for several reasons. The skewed construction, for example, results in a more uniform torque and a quieter motor, among other things.

One common method of manufacturing the skewed slotted rotor is to provide the central shaft receiving aperture of each rotor laminations with two diametrically opposed notches. The rotor laminations are then stacked on a rod which contains two raised helically extending portions, arranged to cooperate with the diametrically disposed notches. After the required number of rotor laminations has been positioned in the afore-mentioned fashion, the laminations are then permanently secured together by any known means and the rod with the two helical raised portions is removed. Thus, the central notches are formed into an elongated helical pathway or groove, and as a result, the rotor slots attain a skewed configuration in the assembled rotor. A shaft is thereafter inserted into the central aperture and secured therein.

Induction motors using rotors made in the afore-mentioned manner, normally have the rotors mounted and secured to a shaft which in turn is carried by bearings positioned well outside the rotor laminations. To limit the axial movement of the rotor and shaft assembly during rotation, it is common practice to provide spacer members and thrust bearing supports on the shaft between the bearings at their inner ends and the rotor laminations. In the past, one arrangement took the form of sleeve-like spacer members, bearing at the inner end against the laminations and at the outer end against the bearings, keyed to the shaft in order that the support members rotate with the shaft. By using this arrangement, an additional step in the manufacture of the rotor assembly was required in the form of a cutting operation which provided the rotor shaft with a longitudinally extending keyway. In another arrangement, the spacer members were shrunk onto the shaft at the proper location. This involved added expense since the parts had to be manufactured to a particular tolerance. Other designs incorporated the concept of cutting annular grooves into the shaft at predetermined positions to accommodate inwardly projecting inner ends of the spacer members or to hold standard ring retainers where the thrust load requirements are small. Still other schemes required machining of the shaft in order to provide shoulders to cooperate with the thrust bearing means or spacer members, thereby limiting axial movement of the rotor and shaft assembly. As is readily apparent, all of these arrangements add to the expense of manufacture and assembly of electric motors and do not fully utilize the rotor construction.

It is the primary object of the present invention to provide an improved thrust bearing arrangement for electric motors, which is inexpensive and easily assembled, yet will positively limit the axial movement of the rotor and shaft assembly.

Another object of the present invention is to provide a thrust bearing arrangement including a spacer-support member so arranged with the rotor structure that no slots, grooves or other additional elements are required on the shaft, nor is any additional machining of the shaft necessary, thus, overcoming the above-mentioned objections and reducing the cost of manufacture and assembly.

Further objects and advantages will become apparent as the following description proceeds and the subject matter which I regard as my invention is pointed out with particularity in the claims annexed to and forming a part of this specification.

In carrying out the objects of this invention in one form thereof, I provide an induction type electric motor having a stator and frame assembly, and a rotor and shaft assembly. The rotor consists of a plurality of laminations containing centrally disposed shaft receiving apertures and notches forming a groove on the periphery of the bore formed by the apertures. The rotor is secured to a shaft which is carried by a bearing means spaced from the rotor laminations with thrust bearing means provided within this space. Thrust bearing spacer means are provided on the shaft between the thrust bearing means and the rotor laminations in such a manner that the inner end of the spacer means cooperate with the groove, locking the spacer means to the rotor in order that it will rotate with the rotor and transmit the thrust force or load directly to the rotor thereby limiting axial movement of the rotor and shaft assembly.

For a better understanding of the invention, reference may be had to the accompanying drawing which illustrates one embodiment of the present invention.

In the drawing:

Figure 1 is a side elevational view of an electric motor assembly, the view being partially broken away and partially in section in order to illustrate detail;

Figure 2 is a view, partially in section, of the rotor assembly taken on line 2—2 of Figure 1 with the thrust bearing spacer member being broken away in part;

Figure 3 is a perspective view of the thrust bearing spacer member; and

Figure 4 is a perspective view of the rotor and shaft assembly, broken away in part, to illustrate the pathway or groove formed by the rotor notches; the skewed slots which have been filled with the squirrel-cage conductors; and the thrust bearing spacer member before assembling.

Referring to Figure 1 of the drawing, the invention is there shown applied to a small motor 10 of the squirrel-cage induction type. The motor comprises a stator 11 and rotor 12 which are contained within a motor frame 13. For convenience and ease of assembly, motor frame 13 is shown as being comprised of three members: a central cylindrical portion 14, and two end shields 15 and 16, which engage portion 14 by means of rabbeted surfaces. The stator is formed in the standard manner including a core comprising a plurality of stacked thin laminations 17 of magnetic material, and coils 18 mounted in stator slots (not shown) provided in the core. An insulating member 19 is contained in each stator slot between the laminations and the coil. The rotor comprises a stack of thin laminations 20 secured to a shaft 21 in any suitable fashion (not shown) and windings 22 of the squirrel-cage type, which may be die cast in the laminations in accordance with modern practice.

The shaft 21 is carried at each end by bearings 23 and 24, which in turn are secured in the end shield of the motor frame within cylindrical bearing housings 25. As shown, the bearing housings are made integral with the motor end shields. For simplicity of illustration only, one end of the rotor and shaft assembly has been shown in detail, mounted in the bearing assembly, but it is understood that the other end may be mounted in the same manner. Bearings 23 and 24 are fixedly mounted within the bearing housing as by an integral spider or other suitable means. The remaining space within the housing defines a reservoir 26 for retaining lubricant and is filled with lubricant reservoir means, such as the oil impregnated felt pads 27. The bearing, housing and felt pads, as shown, extend inwardly toward the rotor beyond bearing 23 so that oil thrown outwardly from the shaft 21 during shaft rotation may be caught and returned to the reservoir for reuse. In order to further ensure against leakage of the lubricant to the interior portion of the motor, the bearing housing has a cap 28 mounted thereon at its inner end 29. The cap extends inwardly toward the shaft between the rotor 12 and the thrust bearing 37 (the bearing 37 to be described hereinafter) and catches any lubrication thrown off at this bearing, thereby returning the lubricant to the pads 27. The outer portion 30 of the bearing housing is provided with a closure member in the form of a pressed cup 31. Resilient motor mounting annuli 32 are provided at either end of the motor casing and may be clamped to any standard motor support base by any clamping means (not shown) to mount the motor assembly.

Referring to Figure 4, it will be seen that the rotor is of the squirrel-cage type, formed in the afore-mentioned manner with the skewed slot construction. The squirrel-cage 22 has conductor bars 33 extending into and substantially filling skewed slots 34 of the rotor. The rotor assembly is secured to the shaft by any means, such as by an interference fit or by keying the rotor to the shaft (not shown). The rotor includes helical grooves 36 formed by the notches in the individual rotor laminations, these grooves being formed during the skewing process as heretofore described, and obviously these helical grooves could be used for shaft keys. The full importance of these grooves in the present invention will readily become apparent as this description proceeds.

Now in accordance with one preferred embodiment of the present invention, the axial movement of the rotor and shaft is limited by an arrangement as seen in Figure 1. A thrust bearing 37 of the roller type, including respectively stationary and rotating thrust washers 38 and 39, is positioned around shaft 21. A thrust bearing spacer member 40 is located on the shaft by a slip fit in abutting relationship between thrust washer 39 and rotor end face 41. As is more clearly illustrated by Figures 3 and 4, the spacer member 40 is in the form of a sleeve and is provided at one end with a collar 42, which abuts and cooperates with rotatable thrust washer 39, and at the other end with a pair of diametrically opposed projections 43. These projections are adapted to fit into and engage the grooves 36 (see Fig. 2). Thus, it can be seen that the spacer member is locked securely to the rotor for rotation therewith, and that the rotor itself directly absorbs the thrust load upon contact of the spacer end face and collar 42 with the washer 39. In other words, with this improved arrangement the rotor itself absorbs the axial or thrust load directly.

Because of the variations in thickness of the rotor laminations, the over-all axial dimension between the bearing 23 and the rotor face 41 is not always constant. Therefore, shim means 44 may be provided between stationary thrust washer 38 and bearing 23 to compensate for such variations.

Although only one side of the motor has been described in detail, it is understood that a similar thrust bearing arrangement may be employed on the other side of the rotor to complete the axial-movement limiting means.

It should be apparent to those skilled in the art that the axial-movement limiting means shown and described herein, may be used with motors of any other type where a central pathway or notch in the end laminations is provided for any reason whatsoever, such as, for keying the rotor to the shaft, without departing from the true scope and spirit of the invention.

It will be obvious to those skilled in the art that my improved thrust arrangement, as described above, comprises a very advantageous arrangement, particularly for motors in the fractional horsepower sizes. Since my novel thrust bearing spacer member utilizes the groove provided in the rotor itself, the necessity for securing any members onto the shaft is avoided; also no grooves, slots, or shoulders need be provided in the shaft, and further, the rotor limits axial movement of the rotor shaft assembly. In addition, the manner in which the improved spacer is mounted on the motor assembly holds labor costs for assembling the rotor to a minimum, since it is merely necessary to slide the spacer along the shaft until it abuts the outer face of the rotor and engages the rotor grooves.

It will be apparent that while I have illustrated and described my invention in one preferred form, changes may be made in the structure disclosed, without departing from the true spirit and scope of the invention, and I therefore intend in the following claims to cover all such equivalent variations as fall within the invention.

What I claim as new and desire to secure by Letters Patent of the United States is:

1. In an electric motor having a stator and frame assembly, a shaft, a rotor mounted on said shaft and having in at least one end face thereof a notch adjacent said shaft, bearing means rotatably supporting said shaft, a thrust surface spaced apart from said rotor, and at least one spacer positioned on said shaft between said rotor end face and said thrust surface, said spacer member abutting said rotor end face and engaging said notch thereby locking said spacer member to said rotor for rotation therewith to transmit a thrust load directly to said rotor.

2. In an electric motor having a stator and frame assembly, a shaft, a rotor mounted on said shaft and having in at least one end face thereof a notch adjacent said shaft, bearing means rotatably supporting said shaft and spaced apart from said rotor, thrust bearing means and a thrust bearing spacer member positioned on said shaft between said rotor and said first mentioned bearing means, said spacer member abutting said rotor end face and having at least one projection engaging said rotor notch thereby locking said spacer member to said rotor for rotation therewith to transmit a thrust load directly to said rotor.

3. A rotor assembly for use in an electric motor, said rotor assembly comprising a rotatable shaft, a rotor comprising a stack of laminations mounted on said shaft and having a plurality of slots adjacent its periphery for accommodating windings and a plurality of internal grooves adjacent said shaft, windings positioned in said slots, and at least one thrust bearing spacer sleeve loosely carried by said shaft, said sleeve having a plurality of axial projections at one end thereof engaging said rotor grooves thereby locking said sleeve to said rotor for rotation therewith whereby the thrust load is transmitted directly to said rotor.

4. In an electric motor having a stator and frame assembly, a shaft, a rotor secured on said shaft and having at least two internal grooves extending the length of said rotor adjacent said shaft, bearing assembly means rotatably supporting said shaft disposed on each side of said rotor, thrust bearing means arranged on said shaft adjacent each bearing assembly means, and a thrust bearing spacer sleeve loosely carried on said shaft between each rotor end face and the adjacent thrust bearing means, each of said sleeves formed at one end with a thrust transmitting surface disposed toward said thrust bearing means and formed at the other end with a plurality of axially extending projections received within said rotor grooves for locking each of said sleeves to said rotor for rotation therewith thereby transmitting thrust loads applied thereto directly to said rotor.

References Cited in the file of this patent

UNITED STATES PATENTS

| | | |
|---|---|---|
| 2,059,891 | Morse | Nov. 3, 1936 |
| 2,769,934 | Stone et al. | Nov. 6, 1956 |